United States Patent
Wang

[19]

[11] Patent Number: 6,070,888

[45] Date of Patent: Jun. 6, 2000

[54] COMBINATION OF A RETRACTABLE HANDLE DEVICE AND A SUITCASE

[76] Inventor: Chien-Shan Wang, No. 80, Tien Hsin Li, Yuan Li, Miao Li Hsien, Taiwan

[21] Appl. No.: 09/130,363

[22] Filed: Aug. 7, 1998

[51] Int. Cl.[7] .................................................. B62B 1/04
[52] U.S. Cl. ..................... 280/37; 280/47.17; 280/645; 280/38; 16/115; 190/18 A; 190/115
[58] Field of Search ................................. 280/37, 38, 40, 280/47.17, 47.18, 47.24, 47.26, 363, 645, 651, 652, 654, 655; 190/115, 116, 117, 18 A; 16/115

[56] References Cited

U.S. PATENT DOCUMENTS

| | | | |
|---|---|---|---|
| 5,374,073 | 12/1994 | Hung-Hsin | 280/30 |
| 5,431,428 | 7/1995 | Marchwiak et al. | 280/655 |
| 5,452,778 | 9/1995 | Wang | 190/115 |
| 5,488,756 | 2/1996 | Hsieh | 16/115 |
| 5,524,737 | 6/1996 | Wang | 190/18 A |
| 5,581,847 | 12/1996 | Hsieh | 16/115 |
| 5,590,748 | 1/1997 | Chang | 190/18 A |
| 5,630,488 | 5/1997 | Chen | 190/115 |
| 5,709,398 | 1/1998 | Lu | 280/47.24 |
| 5,797,617 | 8/1998 | Lin | 280/655 |
| 5,829,558 | 11/1998 | Cheng | 190/116 |
| 5,862,898 | 1/1999 | Chang | 190/115 |
| 5,876,048 | 3/1999 | Lee | 280/47.315 |
| 5,987,701 | 11/1999 | Kuo | 16/113.1 |

*Primary Examiner*—Eric Culbreth
*Assistant Examiner*—L. Lum
*Attorney, Agent, or Firm*—Rosenberg, Klein & Lee

[57] ABSTRACT

A combination of a retractable handle device and a suitcase includes a first base member and a second base member connected to the back of the suitcase, each of the two base member having a slot defined therein. The handle device includes a base portion with two wheels and two outer tubes extend from the base portion. Two first inner tubes are retractable received in the two outer tubes and two second inner tubes are retractably received in the first inner tubes with a handle fixedly connected to the two second inner tubes. Two engaging members are respectively and slidably connected between the two first inner tubes the two second inner tubes. The base portion is disengagably engaged with the second base member. Each of the two engaging members has a connecting member disengagably connected thereto which is engagable to the base member corresponding thereto.

7 Claims, 10 Drawing Sheets

COMBINATION OF A RETRACTABLE HANDLE DEVICE AND A SUITCASE

FIELD OF THE INVENTION

The present invention relates to a retractable handle device and a suitcase to which the retractable handle device is detachably connected.

BACKGROUND OF THE INVENTION

One type of the conventional retractable handle devices is fixedly connected to the back of the suitcase so that when pulling the handle upwardly from the handle device, the suitcase is conveniently moved by the wheels connected to the bottom of the suitcase. However, the retractable handle device is fixed to the suitcase and is enclosed in the suitcase so that should the mechanism of the retractable handle device is damaged, the users usually discard the combination of the suitcase and the retractable handle device. The other type of the conventional retractable handle device is fixedly connected to the back of the suitcase by rivets so that the tubes, casing and the like are exposed and visible. This type is deemed to have no aesthetic appearance.

The present invention intends to provide the combination of the retractable handle device and the suitcase, wherein the retractable handle device has three engaging members and the suitcase has at least two base members so that the engaging members are selectably engaged with the base members to connect the retractable handle device to the suitcase. By this arrangement, the shortcomings of the conventional retractable handle device are to be mitigated and/or obviated.

SUMMARY OF THE INVENTION

In accordance with one aspect of the present invention, a combination of a retractable handle device and a suitcase is provided and comprises a first base member and a second base member respectively connected to the back of the suitcase. A first slot and a second base member are respectively defined in the first base member and the second base member.

The handle device comprises a base portion having two wheels rotatably connected thereto, two outer tubes extending from the base portion to retractably receive two first inner tubes therein, two second inner tubes retractably received in the first inner tubes with a handle fixedly connected to the two second inner tubes. The base portion has a first plate extending therefrom so as to be engaged with the second slot of the second base member. A first engaging member is slidably connected between the two first inner tubes and a second engaging member is slidably connected between the two second inner tubes. Each of the first engaging member and the second engaging member has a connecting member disengagably connected thereto which has a second plate extending therefrom so as to be engaged in the first slot of the first base member.

An object of the present invention is to provide the retractable handle device which is disengagably connected to the suitcase.

Further objects, advantages, and features of the present invention will become apparent from the following detailed description with appropriate reference to the accompanying drawings.

DETAILED DESCRIPTION OF THE PREFERRED EMBODIMENTS

Figure 1:
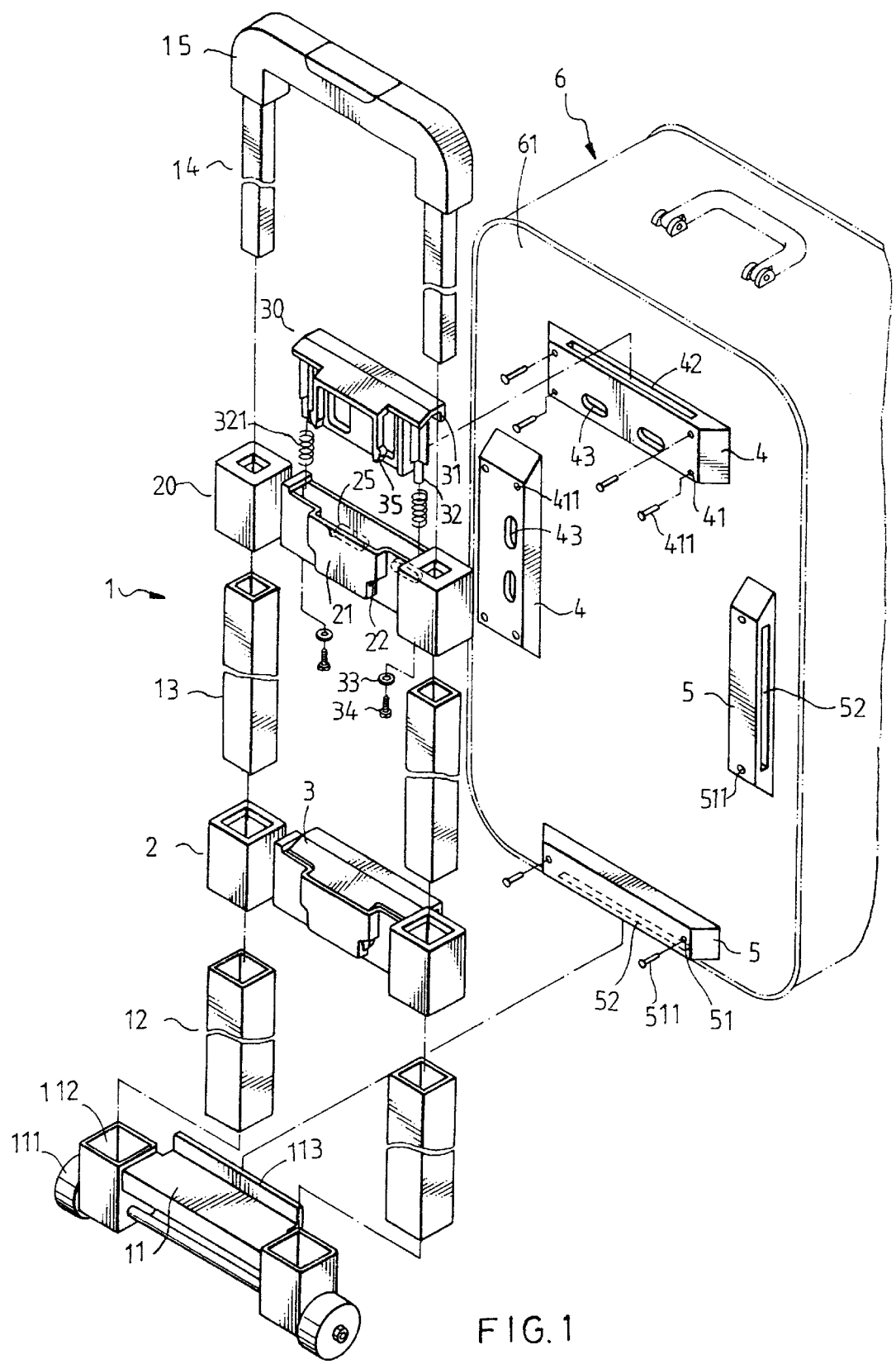
FIG. 1 is an exploded view of the combination in accordance with the present invention.
Figure 2:
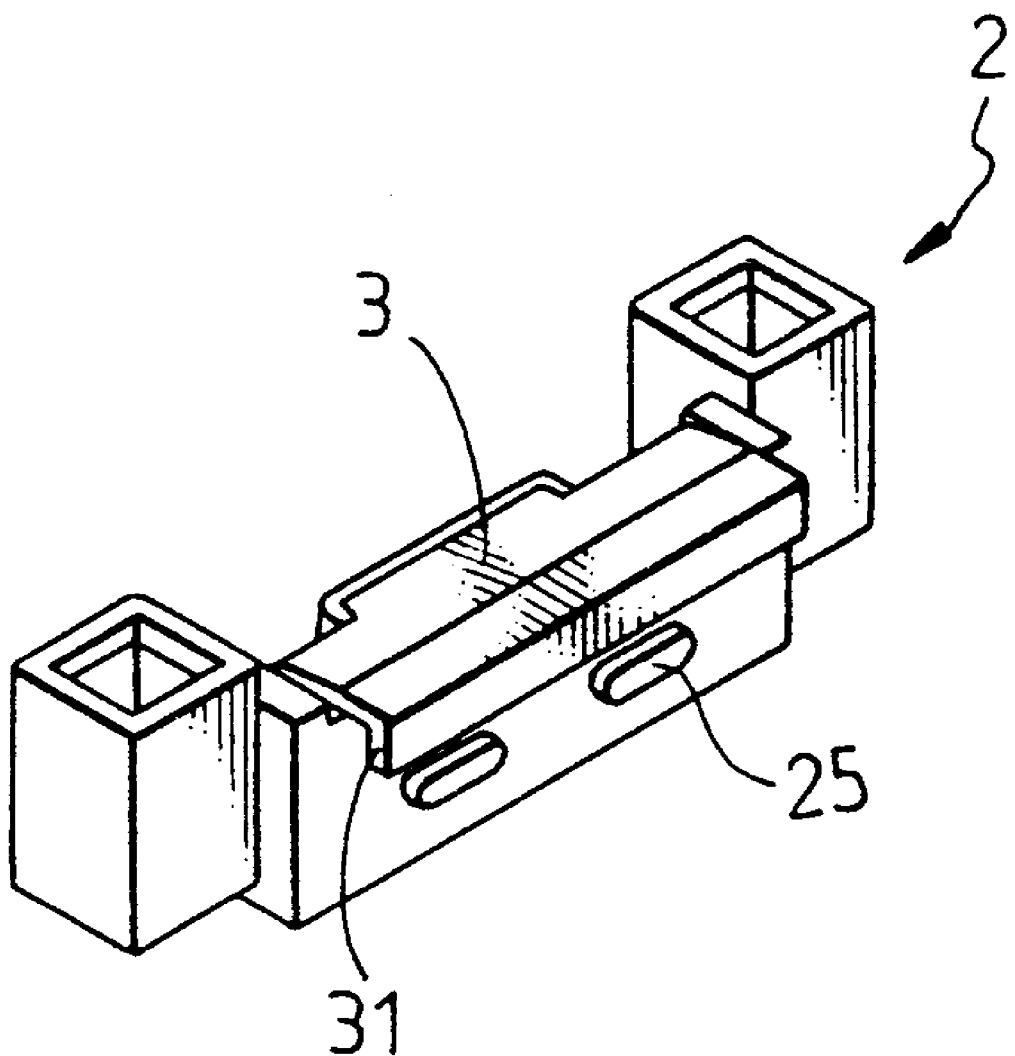
FIG. 2 is a perspective view of the base portion of the retractable handle device in accordance with the present invention.
Figure 3:
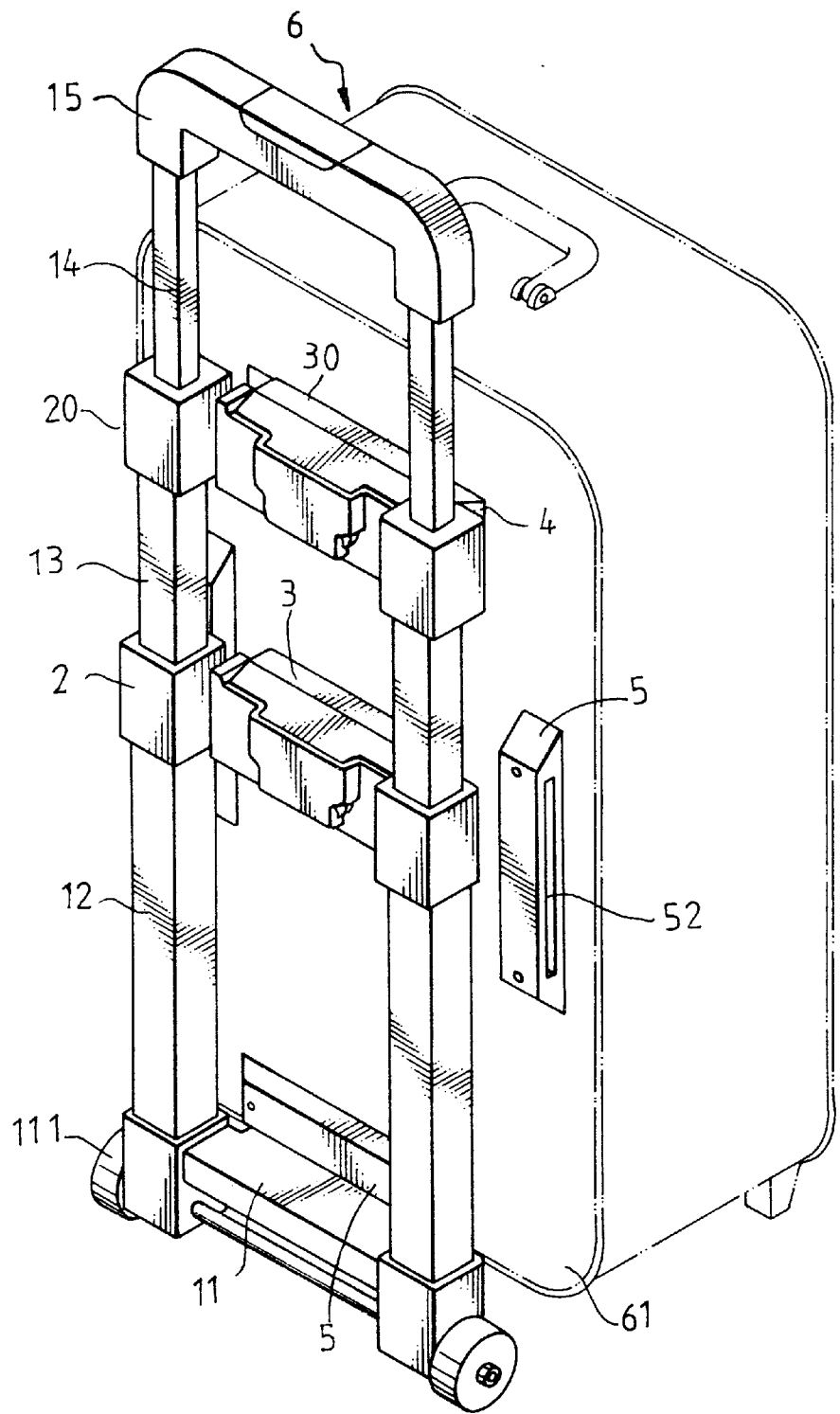
FIG. 3 is a perspective view of the combination in accordance with the present invention.

For a better understanding of the present invention, reference is made to FIGS. 1 through 4 illustrating the combination of a retractable handle device and a suitcase. Two first base members 4 are connected to the back 61 of the suitcase 6 by extending rivets 411 through holes 41 in the first base members 4 and each have a first slot 42 defined therein. Two recesses 43 are defined in each of the two first base members 4. Two second base members 5 are connected to the back 61 of the suitcase 6 by extending rivets 511 through holes 51 in the second base members 5 and each have a second slot 52 defined therein.

Figure 5:
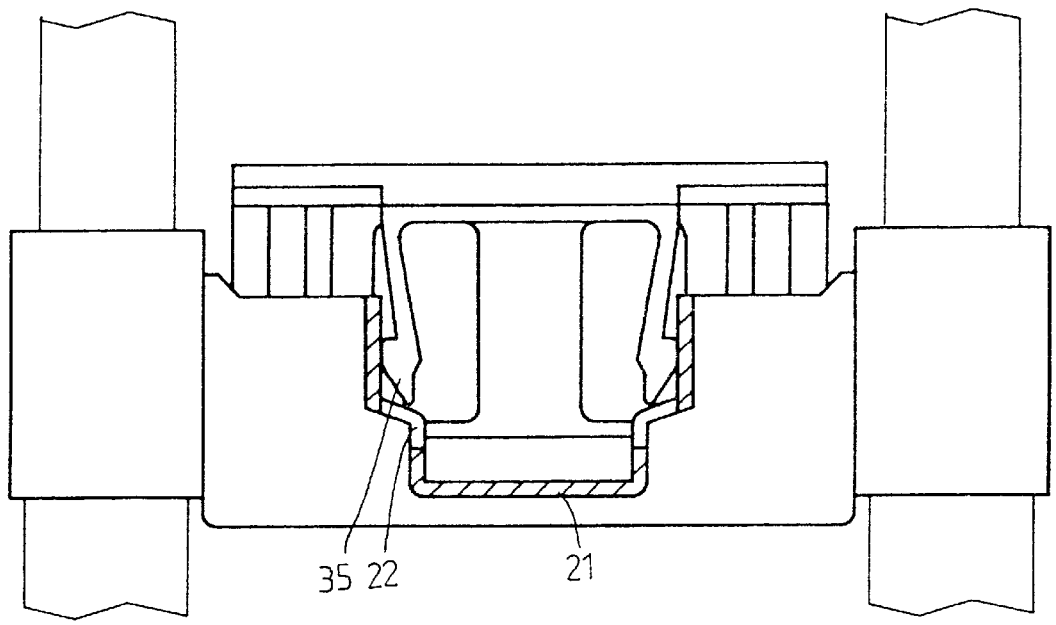
FIG. 5 is an illustrative view to illustrate the connecting member is to be engaged with the engaging member.
Figure 6:
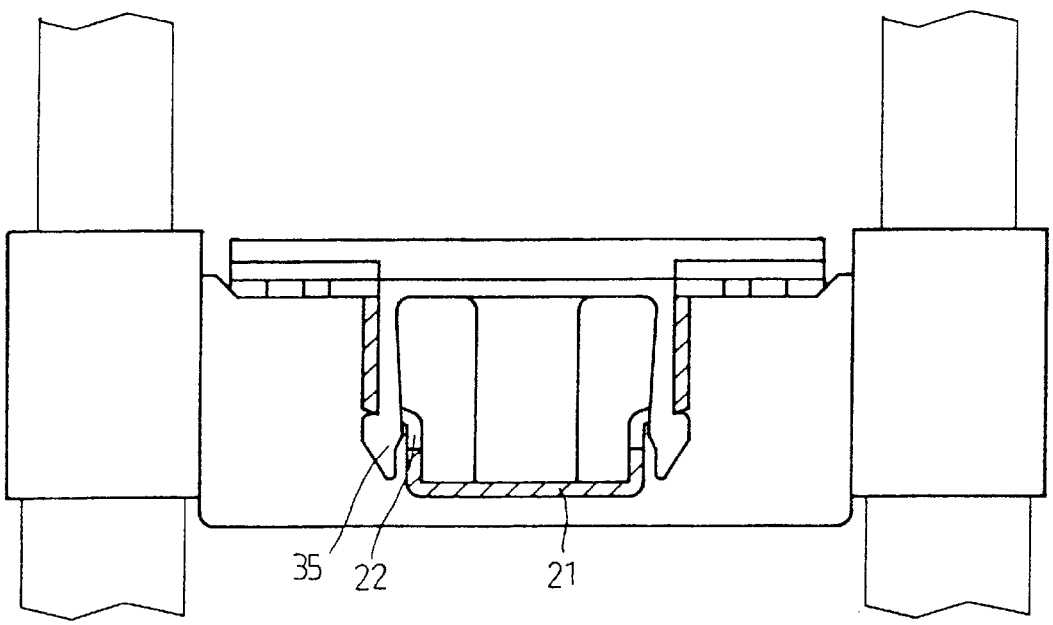
FIG. 6 is an illustrative view to illustrate the connecting member is engaged with the engaging member.

The handle device 1 comprises a base portion 11 having two wheels 111 rotatably connected thereto, two outer tubes 12 inserted into the two side sleeves 112 and extending from the base portion 11, two first inner tubes 13 retractably received in the two outer tubes 12, two second inner tubes 14 retractably received in the two first inner tubes 13, a handle 15 fixedly connected to the two second inner tubes 14. The base portion 11 has a first plate 113 extending therefrom so as to be engaged with the second slot 52 of one of the second base members 5. A first engaging member 2 is slidably connected between the two first inner tubes 13 and a second engaging member 20 is slidably connected between the two second inner tubes 14. Each of the first engaging member 2 and the second engaging member 20 has a connecting member 3/30 disengagably connected thereto which has a second plate 31 extending therefrom so as to be engaged in the first slot 42 of the first base member 4 corresponding thereto. Each of the first engaging member 2 and the second engaging member 20 has a convex portion 21 and two apertures 22 are defined through the bottom of each of the convex portions 21. Referring to FIGS. 5 and 6, each of the connecting members 3, 30 has two hooks 35 which are engaged with the two apertures 22.

Figure 8:
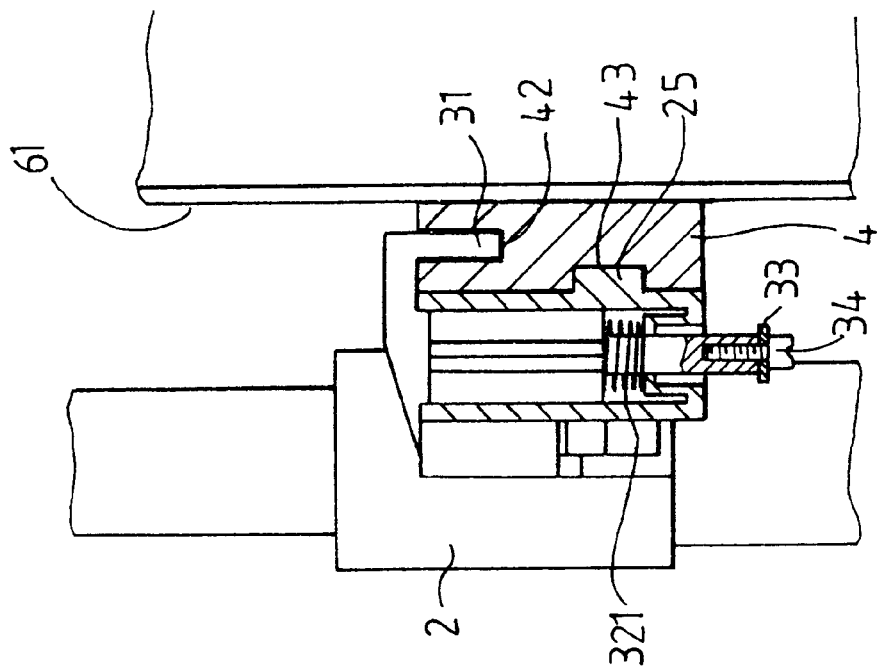
FIG. 8 is a side elevational view, partly in section, of the connecting member is pushed downwardly to engage with the engaging member.
Figure 7:
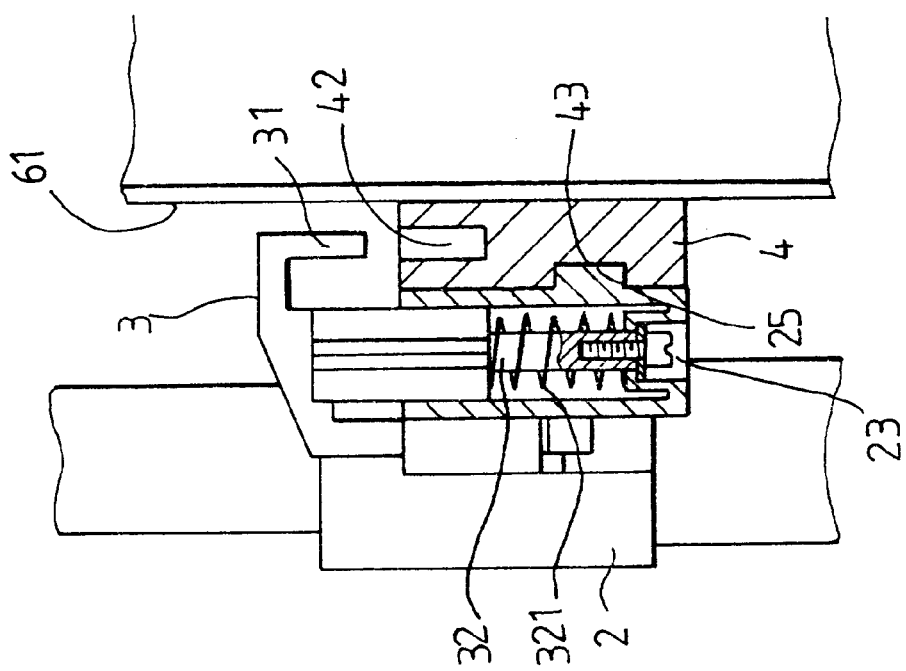
FIG. 7 is a side elevational view, partly in section, of the connecting member is to be engaged with the engaging member.

Referring to FIGS. 7 and 8, two through hole 23 (only one is shown) are defined through the bottom of each of the two convex portions 21, and each of the connecting members 3, 30 has two rods 32 extending therefrom and each of the two rods 32 has a spring 321 mounted thereto. The two rods 32 extend through the through holes 23 corresponding thereto with the springs 321 respectively biased between the enlarged portions of the rods 32 and the peripheries defining the through holes 23. Each of the rods 32 has a washer 33 and a bolt 34 threadedly inserted into the lower end thereof so as to limit the rod 32 from disengaging from the through hole 23. Therefore, when the connecting member 3/30 is engaged with the first or the second engaging member 2/20 by pushing the two hooks 35 into the apertures 22, the two rods 32 of the connecting member 3/30 are pushed downwardly and compress the springs 321. On the other words, when disengaging the connecting member 3/30 from the first or the second engaging member 2, 20 by pushing the two hooks 35, the connecting member 3/30 is biased upwardly by the springs 321. Furthermore, each of the first engaging member 2 and the second engaging member 20 has two protrusions 25 (FIGS. 2, 7 and 8) extending therefrom so as to be received in the two recesses 43 of the first or the second engaging member 2, 20.

Figure 4:
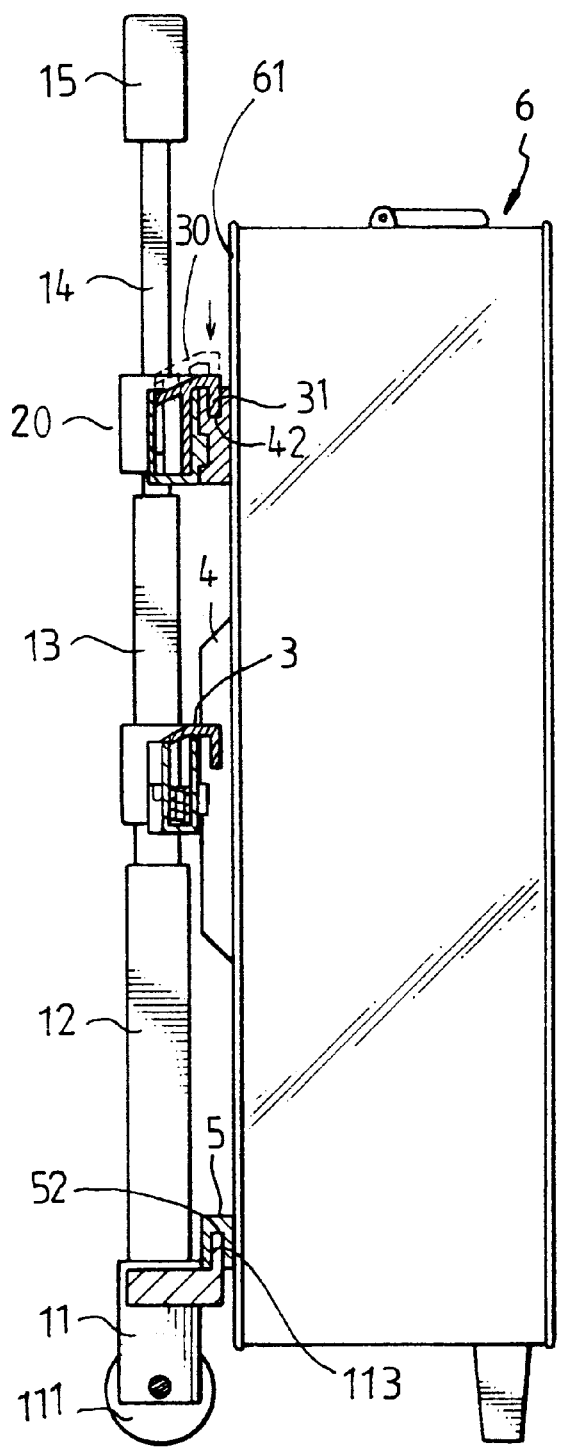
FIG. 4 is a side elevational view, partly in section, of the combination in accordance with the present invention.
Figure 9:
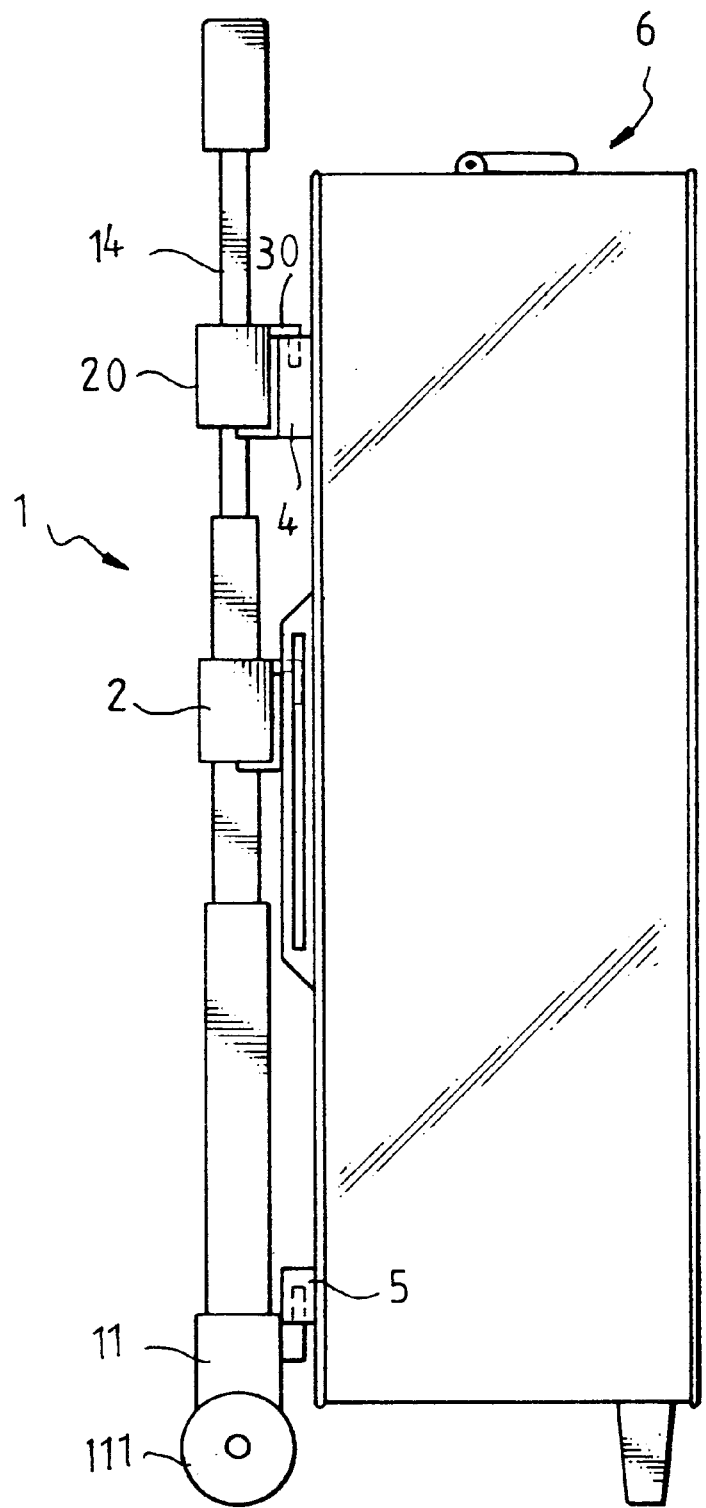
FIG. 9 is a side elevational view to show the combination in accordance with the present invention, wherein the size of suitcase is large.
Figure 10:
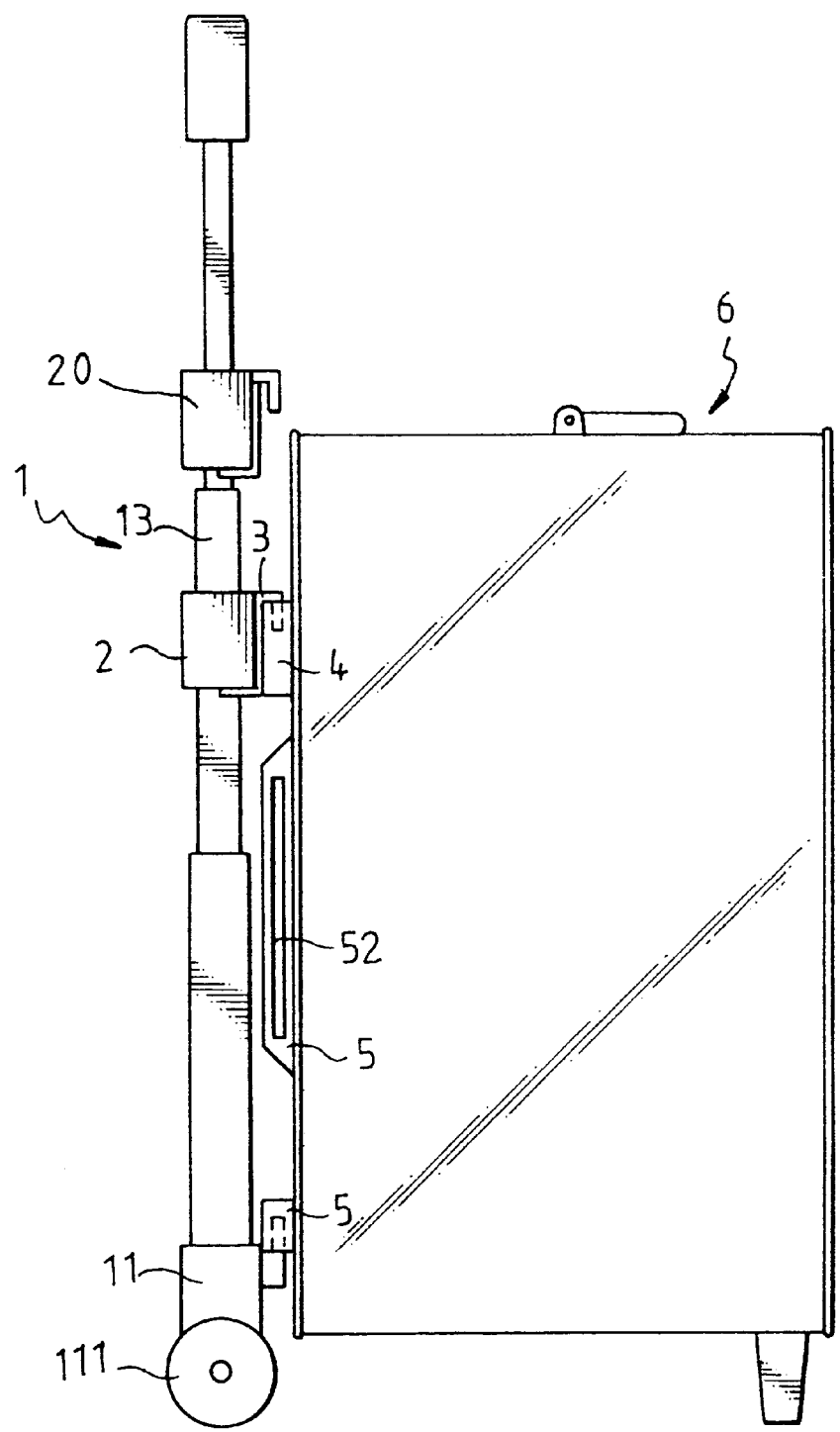
FIG. 10 is side elevational view to show the combination in accordance with the present invention, wherein the size of suitcase is small.

Further referring to FIGS. 4, 9 and 10, the user can select the first engaging member 2 or the second engaging member 20 to engage with the first base member 4 on the suitcase 6, so that no matter the suitcase 6 has a large or a small size, they can be cooperated with the retractable handle device 1 properly.

Figure 11:
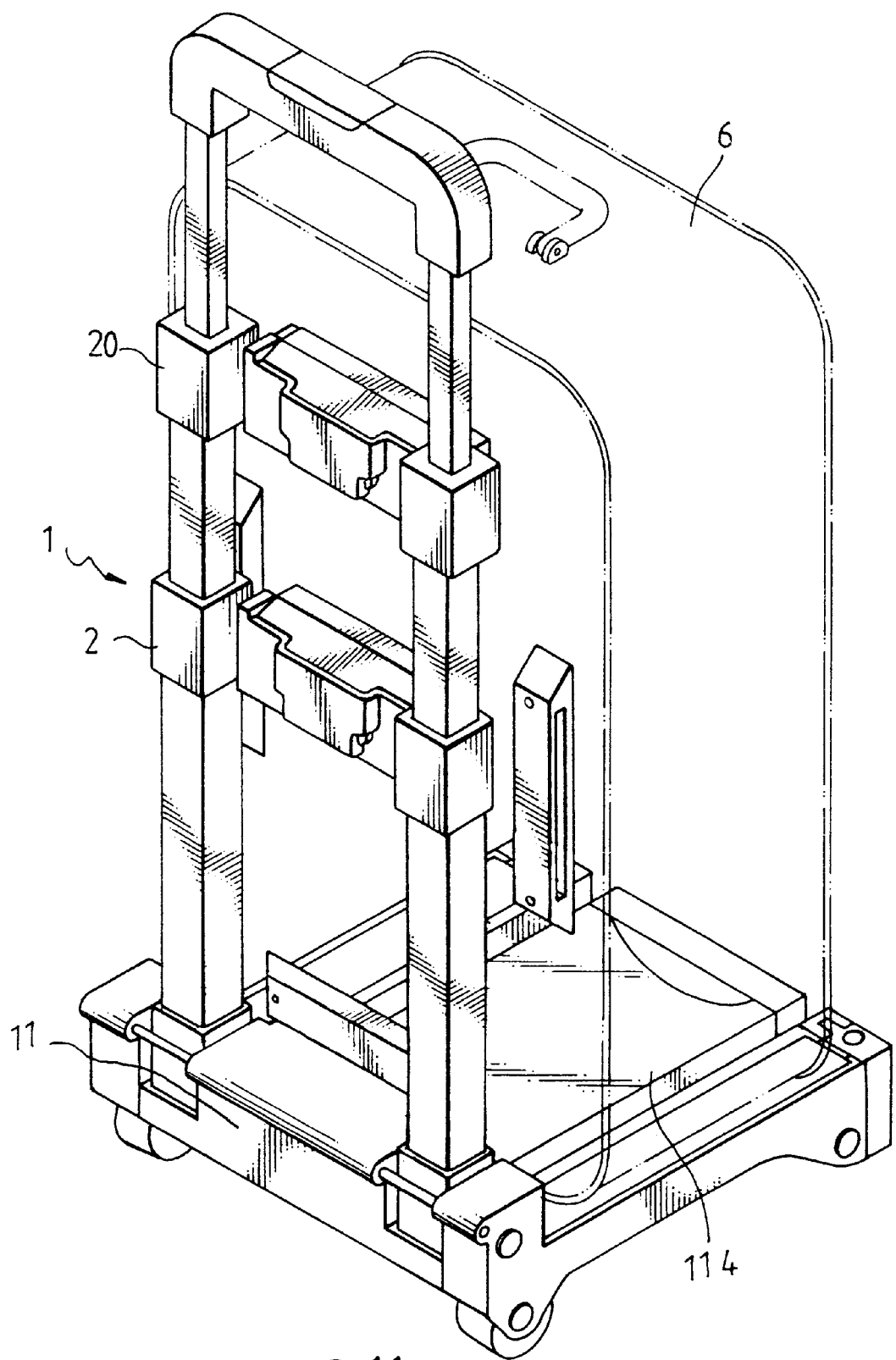
FIG. 11 is perspective view to show an embodiment of the present invention, wherein the base portion has a supporting portion extending laterally therefrom so as to support the suitcase.
Figure 12:
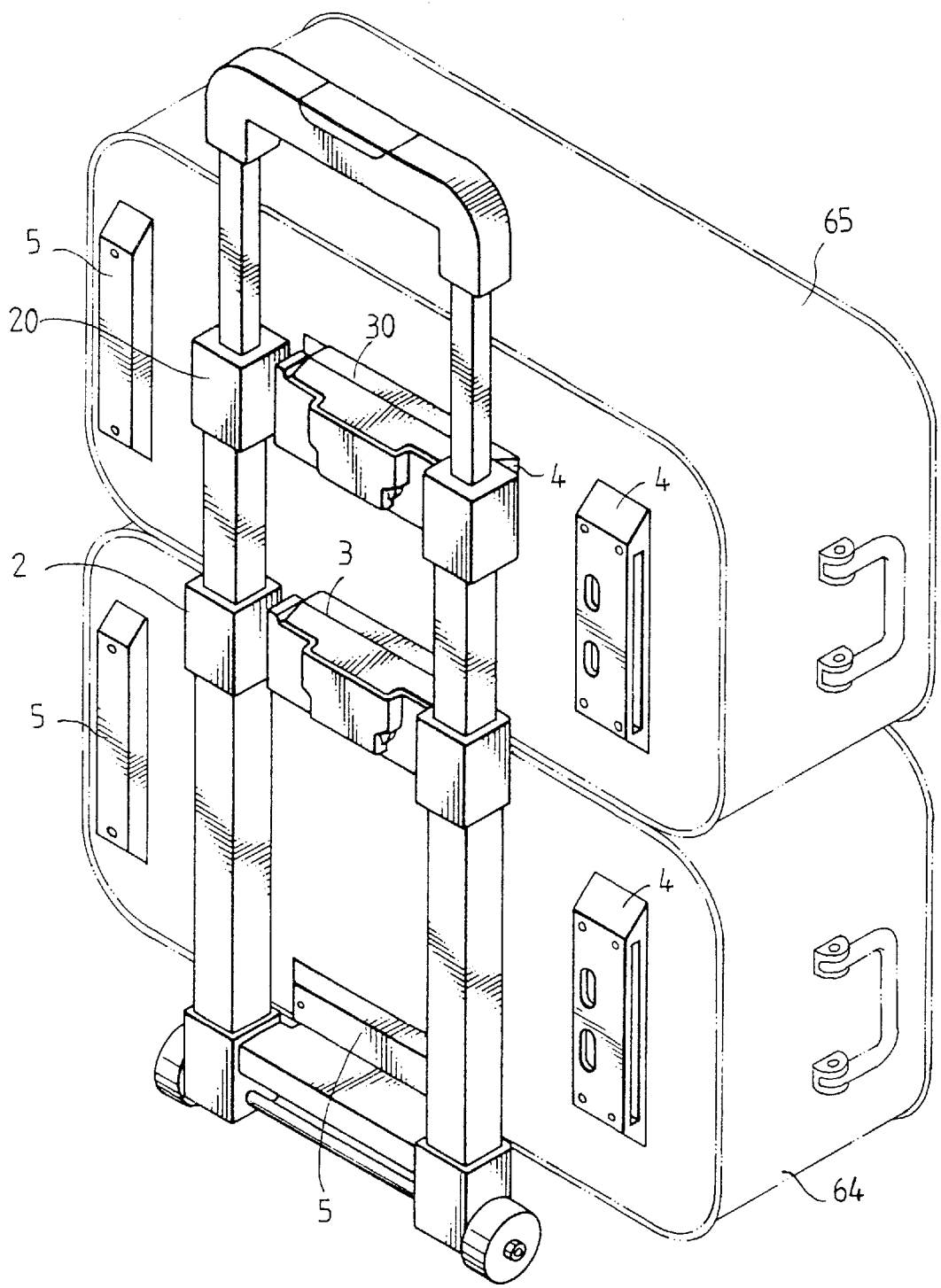
FIG. 12 is perspective view to show another embodiment of the present invention, wherein two suitcases are connected to the retractable handle device of the present invention.

Referring to FIG. 11, the base portion 11 may have a supporting portion 114 extending laterally therefrom so that the suitcase 6 is firmly and stably put on the supporting portion 114. Referring to FIG. 12, two suitcases 64, 65 are simultaneously cooperated with the retractable handle device 1 by respectively engaging the first engaging member 2 and the second engaging member 20 to the two first base members 4 on the two different suitcases 64, 65. Therefore, the two suitcases 64, 65 are securely connected to the handle device 1.

Accordingly, the retractable handle device 1 is conveniently operated and connected to the suitcase(s) 6. The retractable handle device 1 can properly cooperate with the suitcases 6 with different sizes so that the users is allowed to have one retractable handle device 1 and a plurality of suitcases 6 with different sizes.

The invention is not limited to the above embodiment but various modification thereof may be made. It will be understood by those skilled in the art that various changes in form and detail may made without departing from the scope and spirit of the present invention.

What is claimed is:

1. A combination of a retractable handle device and a suitcase, comprising:

at least one first base member connected to the back of said suitcase and having a first slot defined therein;

at least one second base member connected to the back of said suitcase and having a second slot defined therein;

said retractable handle device comprising a base portion having two wheels rotatably connected thereto, two outer tubes extending from said base portion, two first inner tubes retractably received in said two outer tubes, two second inner tubes retractably received in said first inner tubes, a handle fixedly connected to said two second inner tubes, a first engaging member slidably connected between said two first inner tubes and a second engaging member slidably connected between said two second inner tubes, said base portion having a first plate extending therefrom so as to be engaged with said second slot of said second base member, and each of said first engaging member and said second engaging member having a connecting member disengagably connected thereto which has a second plate extending therefrom so as to be engaged in said first slot of said first base member.

2. The combination as claimed in claim 1, wherein each of said first engaging member and said second engaging member has two apertures defined through the bottom thereof, each of said connecting members having two hooks which are engaged with said two apertures.

3. The combination as claimed in claim 1, wherein each of said first engaging member and said second engaging member has at least one through hole defined through the bottom thereof, each of said connecting members has at least one rod extending therefrom which has a spring mounted thereto and extends through said at least one through hole corresponding thereto, said spring biased between said connecting member and the periphery defining said through hole.

4. The combination as claimed in claim 3 further comprising a bolt threadedly inserted into said at least one rod corresponding thereto so as to limit said at least one rod from disengaging from said through hole.

5. The combination as claimed in claim 1 further comprising two recesses defined in said first base member and two protrusions extending from each of said first engaging member and said second engaging member so that said two protrusions are received in said two recesses.

6. The combination as claimed in claim 1 further comprising a supporting portion extending laterally from said base portion.

7. The combination as claimed in claim 1, wherein said back of said suitcase has another first base member and another second base member.

* * * * *